UNITED STATES PATENT OFFICE.

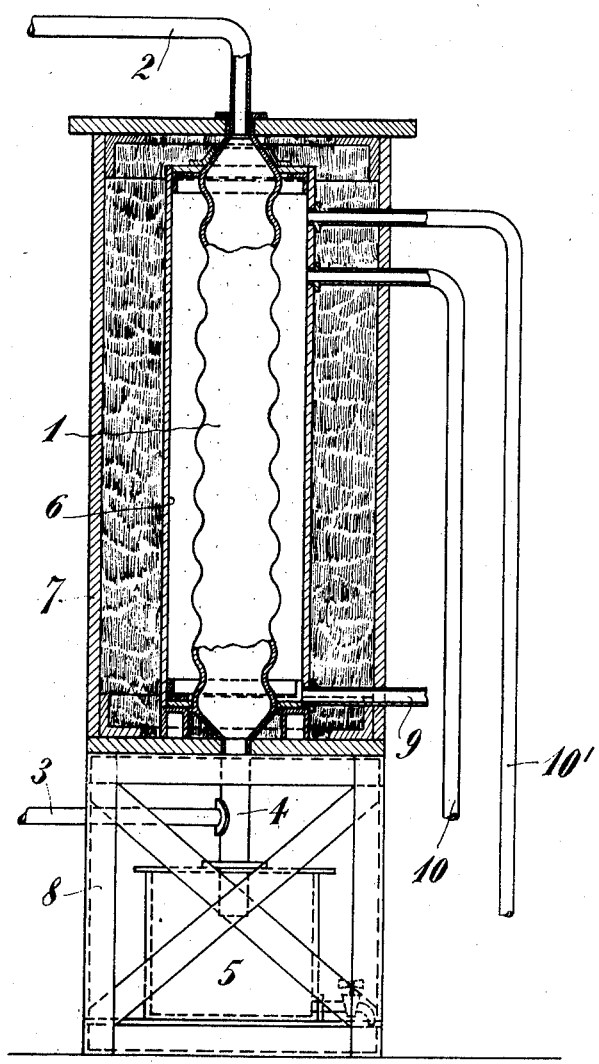

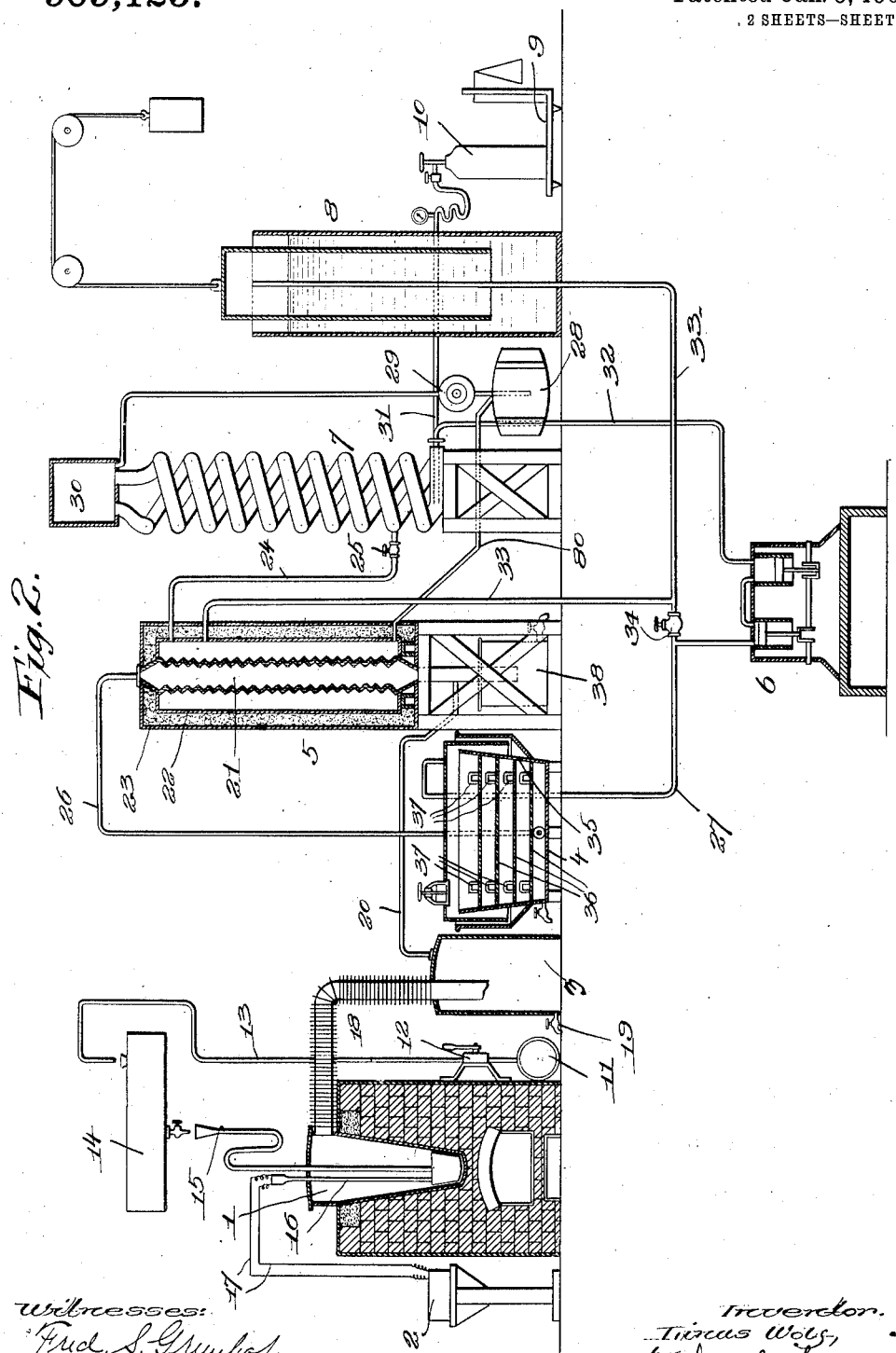

LINUS WOLF, OF DÜBENDORF, SWITZERLAND.

APPARATUS FOR TREATING DISTILLATION-GASES.

No. 909,125.　　　　Specification of Letters Patent.　　　　Patented Jan. 5, 1909.

Application filed December 10, 1906. Serial No. 347,013.

*To all whom it may concern:*

Be it known that I, LINUS WOLF, a subject of the German Emperor, residing at Dübendorf, Canton Zurich, Switzerland, have invented Apparatus for Treating Distillation-Gases, of which the following is a specification.

This invention relates to an apparatus for manufacturing liquefied gas from distillation gases.

Distillation gases produced by the dry distillation of crude oil, petroleum and similar raw material, contain a variety of hydrocarbons of the methane, ethylene, acetylene and other series which may be roughly divided into four classes as follows:

Class 1 contains those substances which are in solid or liquid form at ordinary temperatures and the boiling point of which is well above ordinary temperature. Examples of this class are kerosene, lubricating oils, vaseline, tar, etc.

Class 2 contains those substances which boil at or near ordinary temperature, including those which may be readily liquefied by cooling or by pressure. Examples of this class are gasolene, benzin, naphtha, etc.

Class 3 contains those substances which are gaseous at ordinary temperature and pressures but which can be liquefied either by a very high refrigeration or by a vigorous refrigeration combined with the application of considerable pressure. Examples of this class are acetylene, propane, pentane, etc.

Class 4 contains those substances which can be liquefied only by extremely high pressure in connection with excessively high refrigeration. Examples of this class are hydrogen, methane, etc., gases which because of the difficulty with which they can be liquefied are commonly referred to as permanent gases.

The above-described classification is a general one only and many of the various hydrocarbons contained in distillation gases are so similar to each other that there is no sharp line between the different classes.

The apparatus herein shown and described is one which is adapted to take distillation gases and eliminate therefrom those constituents belonging generally to Classes 1 and 2, and then to liquefy those constituents belonging generally to Class 3. The liquid thus produced is a liquefied gas which can be bottled or packaged in liquid form. A liquefied gas thus made can be readily converted into a vapor and used for illuminating and heating purposes.

The apparatus herein shown and described contains many features which are common to hitherto known apparatus for producing a suitable gas from distillation gases.

The novel feature of the apparatus relates principally to the construction of the cooling device by which the distillation gases are cooled for the purpose of eliminating the constituents belonging generally to Class 2 as above defined, and for the further purpose of permitting a proper liquefaction of the constituents belonging generally to Class 3.

In the drawings wherein I have illustrated one embodiment of my invention, Figure 1 is a vertical section of a portion of a cooling apparatus, and Fig. 2 is a diagram of the complete gas-generating and liquefying plant.

The distillation gases are produced in the first instance by means of a distilling apparatus which may have any suitable or usual construction and which is herein shown as comprising a retort 1 in which crude oil, waste or by-products, bitumen or other raw material, is distilled or gasified by the heat of the furnace below the retort. The crude oil or other raw material is pumped by means of a hand pump 12 and pipe 13 from a barrel or other source of supply 11 to a reservoir 14 from which it flows through the pipe 15 into the retort 1. The heat of the retort can be conveniently controlled automatically by means of a thermostat of suitable construction which is herein shown as including a pipe 16 which extends into the retort and in which is a platinum wire connected to the conducting wires 17 which lead to a thermopile 2. The retort 1 has connected thereto a pipe 18 which leads to a tank or vessel 3 provided with a drip cock 19. This vessel 3 is such as is commonly used for removing from the gas the heavy products, such as tar, which belong generally to Class 1 as above defined. The tank 3 has connected thereto a pipe 20 which leads to the cooling apparatus 5 in which the gas is vigorously refrigerated. This gas cooler forms one of the novel features of the invention. As herein shown it comprises a central chamber 21 which is preferably in the form of a corrugated pipe or conduit with the lower portion of which the pipe 20 communicates. The lower end of the chamber 21 extends into a vessel 38, and the upper end of said chamber or pipe 21 is connected by a pipe 26 to a gas purifier 4. The corrugated pipe or chamber 21 is inclosed within a casing 22 which is surrounded by an outer casing 23 which may be made of boards and which provides between it and the inner casing 22 a space that is filled with some suitable insulating material such as turf. The space between the inner casing 22 and the corrugated pipe 21 is adapted to receive an expanding gas, as will be presently described, for the purpose of securing the vigorous refrigeration of the distillation gases as they pass up through the chamber 21.

The purifier 4 is of any suitable or known construction and comprises the inner reservoir 35 which is wider at the top than at the bottom and within which is placed the plurality of plates or gratings 36 each formed in one piece and provided with handles 37 by which it may be readily removed. The purifying of the gas is accomplished by green vitriol placed on the gratings in a well-known way. The gas purifier is connected by a pipe 27 to a compressor 6, said pipe 27 having connected thereto a pipe 33 which leads to a gasometer 8. The compressor also has connected thereto a pipe 32 which leads into a gas-separating apparatus 7 which is in the form of a closed chamber adapted to be filled with petroleum, gasolene or other suitable oil. The closed chamber is herein shown as in the form of serpentine pipes into the lower end of which the pipe 32 leads, and the upper ends of which communicate with a chamber 30. The chamber 30 is connected by a pipe with a barrel or tank 28 adapted to contain petroleum or gasolene, and 29 is a high pressure pump adapted to pump the gasolene or petroleum from the tank 28 into the reservoir 30 and into the serpentine pipes 7. The lower end of the pipes 7 connect by a pipe 31 to the cylinder or tank 10 to be filled with the liquefied gas. A weighing device 9 is shown for weighing the amount of liquid filled into the tank or cylinder 10.

The vigorous refrigeration of the distillation gases as they pass through the chamber 21 is secured by connecting the interior of the inner casing 22 with the coils 7 by a pipe 24 which has a reducing valve 25 therein and by also connecting the interior of said casing 22 to the pipe 33. The lower end of the casing 22 is connected by a pipe 80 with the tank 28.

The operation of the apparatus is as follows: The distillation gases produced in the retort 1 are carried over into the tank 3 through the pipe 18, and as the pipe 18 is provided with radiating ribs, these distillation gases become cooled sufficiently in said pipe and in the tank 3 so that the heavy products, such as tar, which belong generally to Class 1 as above defined, are condensed in the tank 3, from which they may be drawn off through the valve 19. The distillation gas then passes through the pipe 20 into the chamber 21 where it is vigorously refrigerated, such refrigeration being sufficient to condense in the pipe 21 substantially all those constituents belonging generally to Class 2 as above defined. These liquefied constituents accumulate in the tank 38 from which they may be withdrawn. The gas after having been freed from the constituents comprising generally Classes 1 and 2 as above defined, and while at a low temperature, passes to the gas purifier and from there to the compressor. The compressor is arranged to compress the gas to a very high pressure say to, for instance, 100 atmospheres, and such high pressure in connection with the low temperature produced in the gas cooling apparatus serves to liquefy those constituents which belong generally to Class 3 as above defined, such liquid constituents being forced into the coils 7 which have been previously substantially filled with gasolene by means of the pump 29. When the liquefied gas thus produced is placed under a heavy pressure (say 100 atmospheres) at a low temperature, it has a greater specific gravity than the gasolene in the coil 7 and, therefore, such liquefied gas will remain at the bottom of the coils while the gasolene floats on top. Any unliquefied constituents of the distillation gases pass up through the petroleum or oil in the coils 7 and a certain percentage of the oil unites with the gas and mixes with the liquefied constituents in the bottom of the coils. These liquefied constituents are delivered to the cylinder 10 through the pipe 31.

Since the oil and unliquefied gas in the coils 7 is under a very high pressure (100 atmospheres) and is already at quite a low temperature, the oil and gas which escapes through the pipe 24 vaporizes and expands after it passes the reducing valve 25, and during such expansion a vigorous refrigerating effect is produced within the casing 22. Any liquid which accumulates in the casing 22 may pass back to the tank 28, and the gas within said casing is delivered to the gasometer or may be passed through the compressor again. I regard this manner of securing the vigorous refrigeration in the cooling apparatus as of great importance. In order to secure the end I have in mind, that is, the elimination of the constituents belonging generally to Class 2, it is necessary to vigorously cool the gas, and by using the cooling effect of the expanding gas formed from the gasolene or petroleum in the pipe 7, the desired cooling effect can readily and inexpensively be secured.

No claim is herein made for the process of manufacturing liquefied gas, as claims for the process have been made the subject matter of another application filed by me.

Having described my invention, what I claim as new and desire to secure by Letters Patent s:—

1. In apparatus for treating distillation gases, the combination with a chamber containing petroleum or gasolene, of a gas-cooling apparatus provided with means to effect a refrigeration of the gas by the expansion and vaporization of the contents of said chamber, and a compressor to take the cooled gas from the cooling apparatus and force it under high pressure into said chamber.

2. In apparatus for treating distillation gases, the combination with a chamber containing petroleum or gasolene, of a gas-cooling apparatus comprising a conduit through which the gas passes, an insulating casing surrounding said conduit, means to admit the contents of the chamber under reduced pressure to the casing, and means to force the cooled gas under high pressure into the chamber.

3. In apparatus for treating distillation gases, the combination with a chamber containing petroleum or gasolene, of a gas-cooling apparatus comprising a gas conduit, an insulated casing surrounding the conduit, a pipe connecting the conduit with said chamber, a reducing valve in said pipe, and a compressor to take the cooled gas from the gas-cooling apparatus and force it under pressure into the chamber.

4. In apparatus for treating distillation gases, the combination with means to cool such gases sufficiently to condense the most easily liquefiable constituents, means to separate such constituents from the remaining gases, a chamber containing gasolene, and means to force the unliquefied constituents into the gasolene under heavy pressure.

5. In apparatus for treating distillation gases, the combination with means to generate distillation gases, and means to remove tar and similar heavy products therefrom, of means to liquefy and remove from the distillation gas those constituents thereof which have the same general characteristics as gasolene, a chamber containing gasolene, and means to force the remaining constituents of the distillation gas into said chamber under a heavy pressure.

6. In apparatus for treating distillation gases, the combination with a gas conduit through which said gases pass, an insulated casing surrounding said conduit, means to take the gases which pass through said conduit and subject them to a heavy pressure sufficient to liquefy certain constituents thereof, and means to admit to the space between said conduit and said casing under a reduced pressure a portion of the constituents of the distillation gas which is under heavy pressure whereby the gases passing through the chamber are cooled.

In witness whereof I have signed this specification in the presence of two witnesses.

LINUS WOLF.

Witnesses:
   H. HUBER,
   A. LIEBERKNECHT.